United States Patent
Suzuki et al.

(10) Patent No.: US 9,622,332 B2
(45) Date of Patent: Apr. 11, 2017

(54) EXTREME ULTRAVIOLET LIGHT GENERATION APPARATUS

(71) Applicant: GIGAPHOTON INC., Oyama, Tochigi (JP)

(72) Inventors: Toru Suzuki, Tochigi (JP); Hiroshi Tanaka, Tochigi (JP); Hideyuki Hayashi, Tochigi (JP); Osamu Wakabayashi, Tochigi (JP)

(73) Assignee: GIGAPHOTON INC., Tochigi (JP)

( * ) Notice: Subject to any disclaimer, the term of this patent is extended or adjusted under 35 U.S.C. 154(b) by 322 days.

(21) Appl. No.: 14/061,295

(22) Filed: Oct. 23, 2013

(65) Prior Publication Data
US 2014/0111635 A1 Apr. 24, 2014

(30) Foreign Application Priority Data
Oct. 23, 2012 (JP) .................................. 2012-233553

(51) Int. Cl.
*H05G 2/00* (2006.01)
*G06T 7/20* (2017.01)

(52) U.S. Cl.
CPC ............... *H05G 2/008* (2013.01); *G06T 7/20* (2013.01); *G06T 7/2033* (2013.01); *H05G 2/003* (2013.01); *H05G 2/006* (2013.01); *G06T 2207/30241* (2013.01)

(58) Field of Classification Search
None
See application file for complete search history.

(56) References Cited

U.S. PATENT DOCUMENTS 6,324,255 B1 * 11/2001 Kondo ................... B82Y 10/00
378/119
7,718,985 B1 * 5/2010 Bernath ................. H05G 2/008
250/492.2
(Continued)

FOREIGN PATENT DOCUMENTS

JP 2006-110776 A 4/2006

OTHER PUBLICATIONS

An Office Action; "Notice of Reasons for Rejection," issued by the Japanese Patent Office on Jul. 26, 2016, which corresponds to Japanese Patent Application No. 2012-233553 and is related to U.S. Appl. No. 14/061,295; with English language translation.

*Primary Examiner* — Michael Logie
(74) *Attorney, Agent, or Firm* — Studebaker & Brackett PC

(57) ABSTRACT

In an extreme ultraviolet light generation apparatus, a target detection section may include a light source, a transfer optical system, an image sensor configured to output image data of an image that has been formed by irradiating a target outputted from a target supply device with light outputted from the light source on a light-receiving unit of the image sensor by the transfer optical system, and a processing unit, connected to the image sensor, configured to receive the image data, obtain a first optical intensity distribution along a first line that intersects with a trajectory of the target and a second optical intensity distribution along a second line that intersects with the trajectory, calculate a center of gravity position in the first optical intensity distribution and a center of gravity position in the second optical intensity distribution, and calculate an actual path of the target based on the calculated positions.

6 Claims, 15 Drawing Sheets

(56) References Cited

U.S. PATENT DOCUMENTS

| | | | |
|---|---|---|---|
| 2004/0195529 A1* | 10/2004 | Hergenhan | H05G 2/008 250/504 R |
| 2005/0199829 A1* | 9/2005 | Partlo | B82Y 10/00 250/504 R |
| 2005/0205810 A1* | 9/2005 | Akins | B82Y 10/00 250/504 R |
| 2007/0001130 A1* | 1/2007 | Bykanov | H05G 2/001 250/493.1 |
| 2010/0294958 A1* | 11/2010 | Hayashi | H05G 2/006 250/504 R |
| 2012/0292527 A1* | 11/2012 | Fomenkov | B22F 3/105 250/432 R |
| 2012/0305811 A1* | 12/2012 | Wakabayashi | H05G 2/008 250/504 R |
| 2013/0026393 A1* | 1/2013 | Abe | H05G 2/005 250/504 R |
| 2014/0091239 A1* | 4/2014 | van der Burgt | H05G 2/008 250/504 R |
| 2014/0133726 A1* | 5/2014 | Garner | A61B 5/4504 382/131 |
| 2015/0082498 A1* | 3/2015 | Meyer | G01Q 30/02 850/1 |

* cited by examiner

EXTREME ULTRAVIOLET LIGHT GENERATION APPARATUS

CROSS-REFERENCE TO A RELATED APPLICATION

The present application claims priority from Japanese Patent Application No. 2012-233553 filed Oct. 23, 2012.

BACKGROUND

1. Technical Field

The present disclosure relates to extreme ultraviolet light generation apparatuses.

2. Related Art

In recent years, semiconductor production processes have become capable of producing semiconductor devices with increasingly fine feature sizes, as photolithography has been making rapid progress toward finer fabrication. In the next generation of semiconductor production processes, microfabrication with feature sizes at 60 nm to 45 nm, and further, microfabrication with feature sizes of 32 nm or less will be required. In order to meet the demand for microfabrication with feature sizes of 32 nm or less, for example, an exposure apparatus is needed in which a system for generating EUV light at a wavelength of approximately 13 nm is combined with a reduced projection reflective optical system.

Three kinds of systems for generating EUV light are known in general, which include a Laser Produced Plasma (LPP) type system in which plasma is generated by irradiating a target material with a laser beam, a Discharge Produced Plasma (DPP) type system in which plasma is generated by electric discharge, and a Synchrotron Radiation (SR) type system in which orbital radiation is used to generate plasma.

SUMMARY

An extreme ultraviolet light generation apparatus according to an aspect of the present disclosure may be an extreme ultraviolet light generation apparatus that irradiates a target with a pulse laser beam at a plasma generation region, and may include a chamber, a conducting optical system, a target supply device, and a target detection section. The chamber may be provided with a through-hole. The conducting optical system may be configured to conduct the pulse laser beam to the plasma generation region in the chamber via the through-hole. The target supply device may be configured to output the target toward the plasma generation region. The target detection section may have a light source, a transfer optical system, an image sensor, and a processing unit. The image sensor may be configured to output image data of an image that has been formed by irradiating the target outputted from the target supply device with light outputted from the light source and that has then been formed on a light-receiving unit of the image sensor transferred by the transfer optical system. The processing unit may be connected to the image sensor and may be configured to receive the outputted image data, obtain a first optical intensity distribution along a first line that intersects with a trajectory of the target and a second optical intensity distribution along a second line that intersects with the trajectory, calculate a center of gravity position in the first optical intensity distribution and a center of gravity position in the second optical intensity distribution, and calculate an actual path of the target based on the calculated positions.

An extreme ultraviolet light generation apparatus according to another aspect of the present disclosure may be an extreme ultraviolet light generation apparatus that irradiates a target with a pulse laser beam at a plasma generation region, and may include a chamber, a conducting optical system, a target supply device, and a target detection section. The chamber may be provided with a through-hole. The conducting optical system may be configured to conduct the pulse laser beam to the plasma generation region in the chamber via the through-hole. The target supply device may be configured to output the target toward the plasma generation region. The target detection section may have a light source, a transfer optical system, a first line sensor, a second line sensor, and a processing unit. The first line sensor may be configured to output a first optical intensity distribution, along a first line that intersects with a trajectory of the target, obtained when part of an image that has been formed by irradiating the target outputted from the target supply device with light outputted from the light source is formed on a light-receiving unit of the first line sensor transferred by the transfer optical system. The second line sensor may be configured to output a second optical intensity distribution, along a second line that intersects with a trajectory of the target, obtained when part of an image that has been formed by irradiating the target outputted from the target supply device with light outputted from the light source is formed on a light-receiving unit of the second line sensor transferred by the transfer optical system. The processing unit may be connected to the first and second line sensors and may be configured to receive the first and second optical intensity distributions, calculate a center of gravity position in the first optical intensity distribution and a center of gravity position in the second optical intensity distribution, and calculate an actual path of the target from the calculated positions.

An extreme ultraviolet light generation apparatus according to another aspect of the present disclosure may be an extreme ultraviolet light generation apparatus that irradiates a target with a pulse laser beam at a plasma generation region, and may include a chamber, a conducting optical system, a target supply device, and a target detection section. The chamber may be provided with a through-hole. The conducting optical system may be configured to conduct the pulse laser beam to the plasma generation region in the chamber via the through-hole. The target supply device may be configured to output the target toward the plasma generation region. The target detection section may have a light source, a transfer optical system, an image sensor, and a processing unit. The image sensor may be configured to output image data of an image that has been formed by irradiating the target outputted from the target supply device with light outputted from the light source and that has then been formed on a light-receiving unit of the image sensor transferred by the transfer optical system. The processing unit may be connected to the image sensor and may be configured to receive the outputted image data, obtain a first optical intensity distribution along a first line that intersects with a trajectory of the target and a second optical intensity distribution along a second line that intersects with the trajectory, calculate a center position of an area in the first optical intensity distribution whose optical intensity is greater than or equal to a first threshold and a center position of an area in the second optical intensity distribution whose optical intensity is greater than or equal to a second threshold, and calculate an actual path of the target from the calculated positions.

An extreme ultraviolet light generation apparatus according to another aspect of the present disclosure may be an extreme ultraviolet light generation apparatus that irradiates a target with a pulse laser beam at a plasma generation region, and may include a chamber, a conducting optical system, a target supply device, and a target detection section. The chamber may be provided with a through-hole. The conducting optical system may be configured to conduct the pulse laser beam to the plasma generation region in the chamber via the through-hole. The target supply device may be configured to output the target toward the plasma generation region. The target detection section may have a light source, a transfer optical system, a first line sensor, a second line sensor, and a processing unit. The first line sensor may be configured to output a first optical intensity distribution, along a first line that intersects with a trajectory of the target, obtained when part of an image that has been formed by irradiating the target outputted from the target supply device with light outputted from the light source is formed on a light-receiving unit of the first line sensor transferred by the transfer optical system. The second line sensor may be configured to output a second optical intensity distribution, along a second line that intersects with a trajectory of the target, obtained when part of an image that has been formed by irradiating the target outputted from the target supply device with light outputted from the light source is formed on a light-receiving unit of the second line sensor transferred by the transfer optical system. The processing unit may be connected to the first and second line sensors and may be configured to receive the first and second optical intensity distributions, calculate a center position of an area in the first optical intensity distribution whose optical intensity is greater than or equal to a first threshold and a center position of an area in the second optical intensity distribution whose optical intensity is greater than or equal to a second threshold, and calculate an actual path of the target from the calculated positions.

BRIEF DESCRIPTION OF THE DRAWINGS

Hereinafter, selected embodiments of the present disclosure will be described with reference to the accompanying drawings.

DETAILED DESCRIPTION

Figure 1:
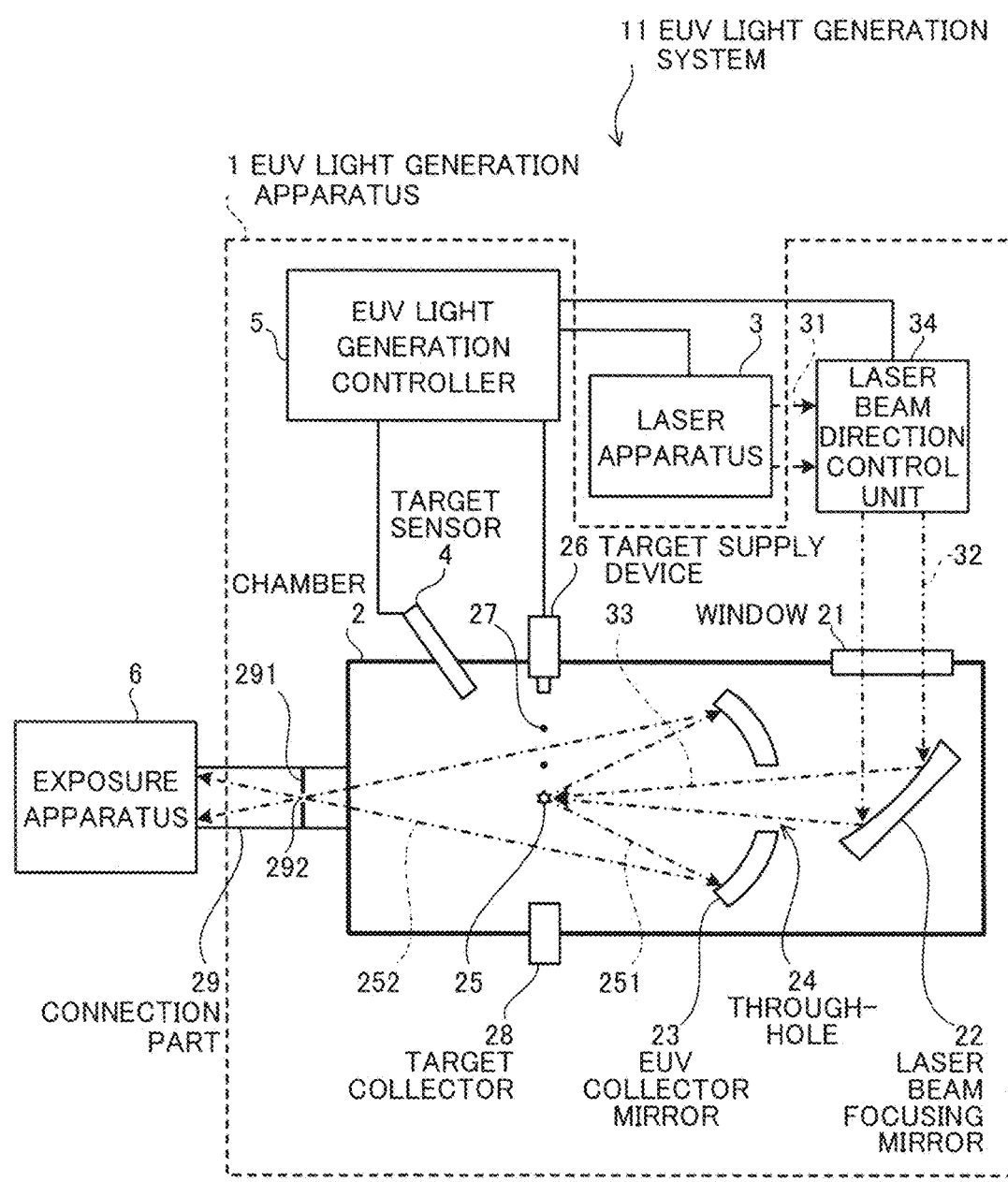
FIG. 1 schematically illustrates an exemplary configuration of an LPP type EUV light generation system.

Hereinafter, selected embodiments of the present disclosure will be described in detail with reference to the accompanying drawings. The embodiments to be described below are merely illustrative in nature and do not limit the scope of the present disclosure. Further, the configuration(s) and operation(s) described in each embodiment are not all essential in implementing the present disclosure. Note that like elements are referenced by like reference numerals and characters, and duplicate descriptions thereof will be omitted herein.

Contents

1. Overview

2. Terms

3. Overview of EUV Light Generation System 3.1 Configuration 3.2 Operation

4. EUV Light Generation Apparatus Including Target Sensor 4.1 Overview of Configuration 4.2 Processing Unit Operations 4.2.1 Main Flow 4.2.2 Image Data Loading (Details of S200)

4.2.3 Contrast Checking (Details of S300)

4.2.4 Background Noise Removal (Details of S400)
4.2.5 Calculation of Center of Gravity of Optical Intensity Distribution (Details of S500)
4.3 Effect
5. Second Embodiment (Calculation of Representative Position in Optical Intensity Distribution)
6. Third Embodiment (Use of Line Sensors)

1. Overview

In an LPP-type EUV light generation apparatus, a target supply device may output a target so that the target reaches a plasma generation region. By a laser apparatus irradiating the target with a pulse laser beam at the point in time when the target reaches the plasma generation region, the target can be turned into plasma and EUV light can be radiated from the plasma.

In order for the laser apparatus to be capable of irradiating the target with the pulse laser beam, a target sensor may detect the target passing through a predetermined region prior to the plasma generation region in a trajectory of the target. This target sensor may include a transfer optical system that forms an image of the target and a light-receiving unit that outputs an optical intensity distribution in the image of the target.

When the target passes through a position that is outside of the trajectory of the target, there are cases where the image of the target becomes blurred at the position where the light-receiving unit is disposed. If the image of the target becomes blurred, it is possible that the position of the target will not be accurately detected.

According to an aspect of the present disclosure, a center of gravity position in the optical intensity distribution outputted by the light-receiving unit may be calculated.

According to another aspect of the present disclosure, a center position of an area in the optical intensity distribution outputted by the light-receiving unit whose optical intensity is greater than or equal to a threshold may be calculated.

According to these aspects, the position of the target can be detected accurately even if the image of the target has become blurred. Through this, the trajectory of the target can be accurately detected.

2. Terms

Several terms used in the present application will be described hereinafter.

A "trajectory" of a target may be an ideal path of a target outputted from a target supply device, or may be a path of a target according to the design of a target supply device.

An "actual path" of the target may be a path on which a target is actually outputted from the target supply device.

3. Overview of EUV Light Generation System 3.1 Configuration

FIG. 1 schematically illustrates an exemplary configuration of an LPP type EUV light generation system. An EUV light generation apparatus 1 may be used with at least one laser apparatus 3. Hereinafter, a system that includes the EUV light generation apparatus 1 and the laser apparatus 3 may be referred to as an EUV light generation system 11. As shown in FIG. 1 and described in detail below, the EUV light generation system 11 may include a chamber 2 and a target supply device 26. The chamber 2 may be sealed airtight. The target supply device 26 may be mounted onto the chamber 2, for example, to penetrate a wall of the chamber 2. A target material to be supplied by the target supply device 26 may include, but is not limited to, tin, terbium, gadolinium, lithium, xenon, or any combination thereof.

The chamber 2 may have at least one through-hole or opening formed in its wall, and a pulse laser beam 32 may travel through the through-hole/opening into the chamber 2. Alternatively, the chamber 2 may have a window 21, through which the pulse laser beam 32 may travel into the chamber 2. An EUV collector mirror 23 having a spheroidal surface may, for example, be provided in the chamber 2. The EUV collector mirror 23 may have a multi-layered reflective film formed on the spheroidal surface thereof. The reflective film may include a molybdenum layer and a silicon layer, which are alternately laminated. The EUV collector mirror 23 may have a first focus and a second focus, and may be positioned such that the first focus lies in a plasma generation region 25 and the second focus lies in an intermediate focus (IF) region 292 defined by the specifications of an external apparatus, such as an exposure apparatus 6. The EUV collector mirror 23 may have a through-hole 24 formed at the center thereof so that a pulse laser beam 33 may travel through the through-hole 24 toward the plasma generation region 25.

The EUV light generation system 11 may further include an EUV light generation controller 5 and a target sensor 4. The target sensor 4 may have an imaging function and detect at least one of the presence, trajectory, position, and speed of a target 27.

Further, the EUV light generation system 11 may include a connection part 29 for allowing the interior of the chamber 2 to be in communication with the interior of the exposure apparatus 6. A wall 291 having an aperture 293 may be provided in the connection part 29. The wall 291 may be positioned such that the second focus of the EUV collector mirror 23 lies in the aperture 293 formed in the wall 291.

The EUV light generation system 11 may also include a laser beam direction control unit 34, a laser beam focusing mirror 22, and a target collector 28 for collecting targets 27. The laser beam direction control unit 34 may include an optical element (not separately shown) for defining the direction into which the pulse laser beam 32 travels and an actuator (not separately shown) for adjusting the position and the orientation or posture of the optical element.

3.2 Operation

With continued reference to FIG. 1, a pulse laser beam 31 outputted from the laser apparatus 3 may pass through the laser beam direction control unit 34 and be outputted therefrom as the pulse laser beam 32 after having its direction optionally adjusted. The pulse laser beam 32 may travel through the window 21 and enter the chamber 2. The pulse laser beam 32 may travel inside the chamber 2 along at least one beam path from the laser apparatus 3, be reflected by the laser beam focusing mirror 22, and strike at least one target 27 as a pulse laser beam 33.

The target supply device 26 may be configured to output the targets) 27 toward the plasma generation region 25 in the chamber 2. The target 27 may be irradiated with at least one pulse of the pulse laser beam 33. Upon being irradiated with the pulse laser beam 33, the target 27 may be turned into plasma, and rays of light 251 including EUV light may be emitted from the plasma. At least the EUV light included in the light 251 may be reflected selectively by the EUV collector mirror 23. EUV light 252, which is the light reflected by the EUV collector mirror 23, may travel through the intermediate focus region 292 and be outputted to the exposure apparatus 6. Here, the target 27 may be irradiated with multiple pulses included in the pulse laser beam 33.

The EUV light generation controller 5 may be configured to integrally control the EUV light generation system 11. The EUV light generation controller 5 may be configured to process image data of the target 27 captured by the target sensor 4. Further, the EUV light generation controller 5 may be configured to control at least one of: the timing when the target 27 is outputted and the direction into which the target 27 is outputted. Furthermore, the EUV light generation controller 5 may be configured to control at least one of: the timing when the laser apparatus 3 oscillates, the direction in which the pulse laser beam 33 travels, and the position at which the pulse laser beam 33 is focused. It will be appreciated that the various controls mentioned above are merely examples, and other controls may be added as necessary.

Figure 2:
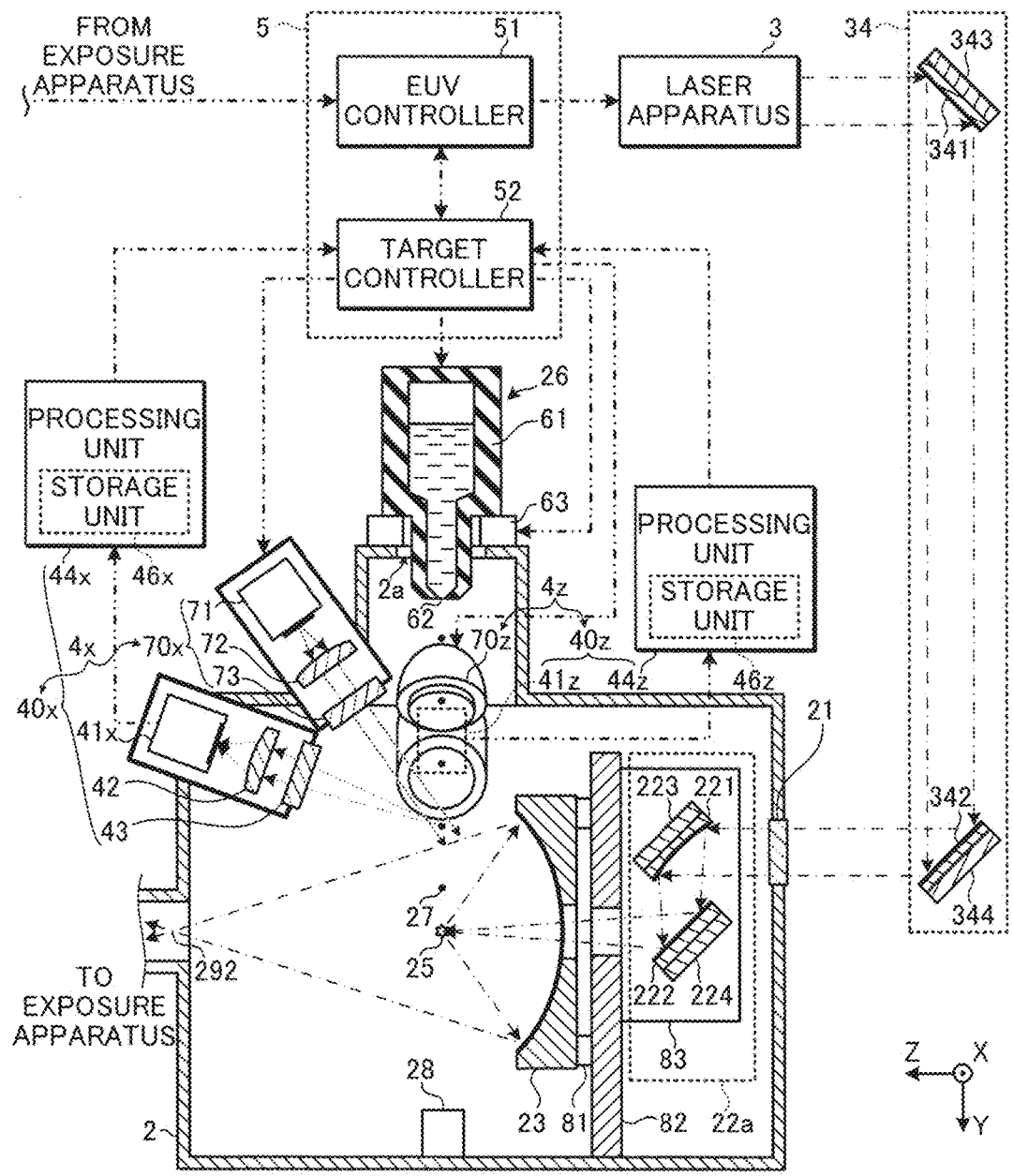
FIG. 2 is a partial cross-sectional view illustrating the configuration of an EUV light generation apparatus according to a first embodiment.

4. EUV Light Generation Apparatus Including Target Sensor 4.1 Overview of Configuration FIG. 2 is a partial cross-sectional view illustrating the configuration of an EUV light generation apparatus according to a first embodiment. As shown in FIG. 2, a laser beam focusing optical system 22a, the EUV collector mirror 23, the target collector 28, an EUV collector mirror holder 81, and plates 82 and 83 may be provided within the chamber 2.

The plate 82 may be anchored to the chamber 2. The plate 83 may be anchored to the plate 82. The EUV collector mirror 23 may be anchored to the plate 82 via the EUV collector mirror holder 81.

The laser beam focusing optical system 22a may include an off-axis paraboloid mirror 221, a flat mirror 222, and holders 223 and 224. The off-axis paraboloid mirror 221 and the flat mirror 222 may be held by the holders 223 and 224, respectively. The holders 223 and 224 may be anchored to the plate 83. The positions and orientations of the off-axis paraboloid mirror 221 and the flat mirror 222 may be held so that a pulse laser beam reflected by those mirrors is focused at the plasma generation region 25. The target collector 28 may be disposed upon a straight line extending from the trajectory of the target 27.

The target supply device 26 may be attached to the chamber 2. The target supply device 26 may include a reservoir 61. The reservoir 61 may hold a target material in a melted state in its interior by using a heater (not shown). An opening 62 that communicates with the interior of the reservoir 61 may be formed in the target supply device 26. Part of the reservoir 61 may be inserted into a through-hole 2a formed in a wall surface of the chamber 2 so that the opening 62 formed in the target supply device 26 is positioned inside the chamber 2. The target supply device 26 may supply the melted target material to the interior of the chamber 2 as droplet-shaped targets 27 via the opening 62.

The target supply device 26 may further include a dual-axis stage 63. The dual-axis stage 63 may be capable of moving the positions of the reservoir 61 and the opening 62 in a left-right direction (a Z direction) and a depth direction (an X direction) in FIG. 2 relative to the chamber 2. Thus, the dual-axis stage 63 may be capable of adjusting an arrival position of the target 27. A sealing means (not shown) may be disposed between a wall surface of the chamber 2 in the periphery of the through-hole 2a, and the reservoir 61. This sealing means may form an airtight seal between the wall surface of the chamber 2 in the periphery of the through-hole 2a, and the reservoir 61.

A target detection section 4x that includes an X direction target sensor 40x and a light-emitting unit 70x may be attached to the chamber 2. The X direction target sensor 40x may include an image sensor 41x, a transfer optical system 42, a window 43, and a processing unit 44x. The processing unit 44x may include a storage unit 46x. The light-emitting unit 70x may include a light source 71, a collimator 72, and a window 73. A target controller 52 may output a light emission instruction signal. Having received the light emission instruction signal, the light-emitting unit 70x may output light toward part of the trajectory of the targets 27. This light may be continuously emitted.

The transfer optical system 42 may form an image of the target 27 that passes through the optical path of the light emitted by the light-emitting unit 70x at a position of a light-receiving unit of the image sensor 41x. The image sensor 41x may capture images, over a set amount of time, of the reflective surfaces of the targets 27 that move in essentially a Y direction while the targets 27 are being irradiated with the light from the light-emitting unit 70x, and may output image data obtained as a result. The image data may be data of an optical intensity distribution in the image formed at the position of the light-receiving unit of the image sensor 41x. The processing unit 44x may calculate data indicating the actual path of the targets 27 based on the image data. The data indicating the actual path of the targets 27 may include, for example, regression line parameters (mentioned later) calculated based on the image data. The X direction target sensor 40x may output the calculated path data to the target controller 52 (mentioned later).

The X direction target sensor 40x may be disposed in a position shifted in the Z direction from a part of the trajectory of the targets 27, which is approximately parallel to the Y direction. Accordingly, the X direction target sensor 40x may be capable of detecting X direction positions for each of a plurality of Y direction positions of the target 27.

An additional target detection section 4z that includes a Z direction target sensor 40z and a light-emitting unit 70z may be further attached to the chamber 2. The Z direction target sensor 40z may include the same types of constituent elements as the constituent elements included in the X direction target sensor 40x. Of the constituent elements included in the Z direction target sensor 40z, only an image sensor 41z, a processing unit 44z, and a storage unit 46z are shown, and the other constituent elements have been omitted from the drawings. The light-emitting unit 70z may include the same types of constituent elements as the constituent elements included in the light-emitting unit 70x. The constituent elements included in the light-emitting unit 70z are not shown in the drawings.

The Z direction target sensor 40z may be disposed in a position shifted in the −X direction from a part of the trajectory of the targets 27, which is approximately parallel to the Y direction. Accordingly, the Z direction target sensor 40z may be capable of detecting Z direction positions for each of a plurality of Y direction positions of the target 27.

The laser beam direction control unit 34 and the EUV light generation controller 5 may be provided outside the chamber 2. The laser beam direction control unit 34 may include high-reflecting mirrors 341 and 342, as well as holders 343 and 344. The high-reflecting mirrors 341 and 342 may be held by the holders 343 and 344, respectively. The laser beam direction control unit 34 may correspond to a conducting optical system.

The EUV light generation controller 5 may include an EUV controller 51 and the target controller 52. In the case where an EUV light generation instruction signal has been outputted from the exposure apparatus 6 (see FIG. 1), the EUV controller 51 may receive the EUV light generation instruction signal. The EUV controller 51 may output a new EUV light generation instruction signal, obtained by imparting a delay time on the EUV light generation instruction signal, to the laser apparatus 3 as a control signal. The EUV controller 51 may store the delay time in a storage device (not shown). The delay time can be calculated from three parameters. These three parameters may be a time at which the target 27 has been detected by a target detector (not shown), a velocity at which the target 27 moves, and a distance from a position at which the target 27 is detected to the plasma generation region 25. The target controller 52 may send a target supply signal to the target supply device 26. The target supply device 26 may supply the targets 27 to the interior of the chamber 2 based on the target supply signal. The target controller 52 may receive the data of the actual path of the targets 27 outputted from the X direction target sensor 40x and the Z direction target sensor 40z.

In the case where the exposure apparatus 6 (see FIG. 1) has outputted information of a target position where the EUV light is to be generated, the EUV controller 51 may receive that target position information and output the information to the target controller 52. A region including the target position and the periphery thereof may be taken as the plasma generation region 25. The target controller 52 may control the dual-axis stage 63 based on the target position information and the data of the actual path of the targets 27 outputted from the X direction target sensor 40x and the Z direction target sensor 40z.

4.2 Processing Unit Operations
4.2.1 Main Flow

Figure 3:
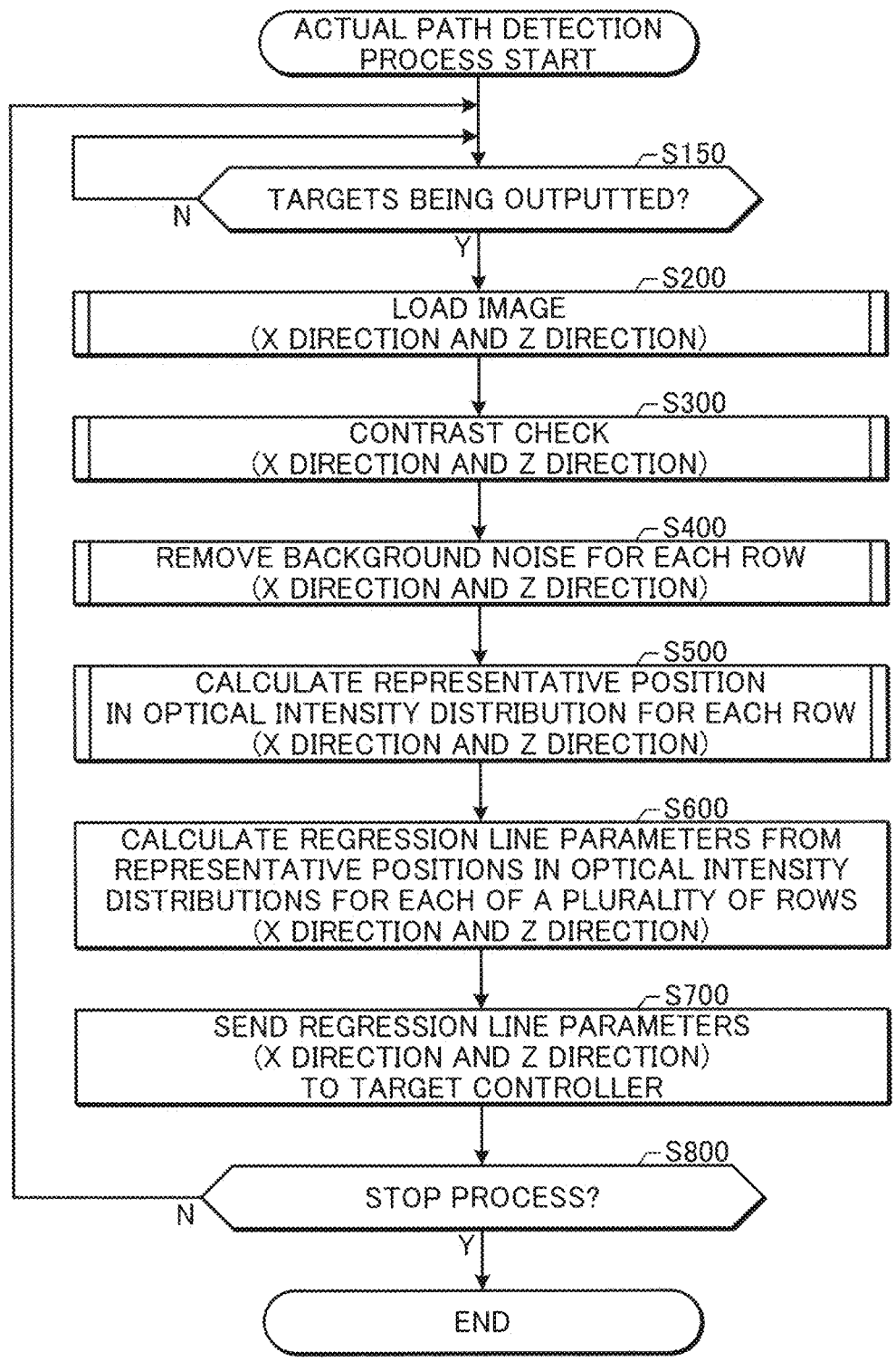
FIG. 3 is a flowchart illustrating operations performed by a processing unit according to the first embodiment.

FIG. 3 is a flowchart illustrating operations performed by the processing unit according to the first embodiment. The processing unit 44x and the processing unit 44z may each perform the following operations in order to detect the actual path of the targets 27.

First, the processing unit 44x and the processing unit 44z may determine whether or not the targets 27 are being outputted from the target supply device 26 (S150). Whether or not the targets 27 are being outputted may be determined based on, for example, whether or not a light amount received by the image sensor 41x or the image sensor 41z has undergone an increase/decrease of greater than or equal to a set value.

In the case where the processing unit 44x and the processing unit 44z have not determined that the targets 27 are being outputted (S150: NO), the process of S150 may be repeated until the processing unit 44x and the processing unit 44z determine that the targets 27 are being outputted. In the case where the processing unit 44x and the processing unit 44z have determined that the targets 27 are being outputted (S150: YES), the processing may be advanced to S200.

In S200, the processing unit 44x may load image data representing an image of the target 27 captured by the image sensor 41x of the X direction target sensor 40x. Likewise, in S200, the processing unit 44z may load image data representing an image of the target 27 captured by the image sensor 41z of the Z direction target sensor 40z. Details of the processing performed in S200 will be given later with reference to FIGS. 4A and 4B.

The image data may be expressed as, for example, bitmap data. The bitmap data can be data in which an image is divided into many pixels in grid form, where the optical intensity of each pixel is expressed as a numerical value. The following descriptions will be given assuming the upper-left corner of the bitmap data serves as an origin, a column number obtained by counting the pixels in the horizontal direction is expressed as J, and a row number obtained by counting the pixels in the vertical direction is expressed as K (see FIG. 4B). A pixel in a specific position is specified by the column number J and the row number K, and is thus expressed as (J, K). An optical intensity of a pixel (J, K) is expressed as I(J, K). In the case where the image data captured by the image sensor 41x or the image sensor 41z includes 512 columns×512 rows of pixels, the value of J can be an integer from 0 to 511, and the value of K can be an integer from 0 to 511.

The image data can be thought of as data of an optical intensity distribution in the trajectory of the targets 27 and the periphery thereof being transferred to the light-receiving unit of the image sensor 41x or the image sensor 41z. The horizontal direction of the image data captured by the image sensor 41x of the X direction target sensor 40x (that is, the direction in which the column numbers J are arranged) can correspond to the X direction in the trajectory of the targets 27 and the periphery thereof. The horizontal direction of the image data captured by the image sensor 41z of the Z direction target sensor 40z (that is, the direction in which the column numbers J are arranged) can correspond to the Z direction in the trajectory of the targets 27 and the periphery thereof. The vertical direction of the image data captured by the image sensor 41x of the X direction target sensor 40x or the image sensor 41z of the Z direction target sensor 40z (that is, the direction in which the row numbers K are arranged) can correspond to the Y direction in the trajectory of the targets 27 and the periphery thereof.

Next, the processing unit 44x may perform a contrast check on each row of the image data loaded in S200 and extract rows whose optical intensity contrasts are greater than or equal to a set value (S300). This process may be performed on the image data captured by the image sensor 41x of the X direction target sensor 40x. Likewise, the processing unit 44z may perform a contrast check on each row of the image data loaded in S200 and extract rows whose optical intensity contrasts are greater than or equal to a set value (S300). This process may be performed on the image data captured by the image sensor 41z of the Z direction target sensor 40z. Details of these processes will be given later with reference to FIGS. 5A to 5C.

Next, the processing unit 44x may remove background noise from each of the rows extracted in S300 (S400). This process may be performed on the image data captured by the image sensor 41x of the X direction target sensor 40x. Likewise, the processing unit 44z may remove background noise from each of the rows extracted in S300 (S400). This process may be performed on the image data captured by the image sensor 41z of the Z direction target sensor 40z. Details of these processes will be given later with reference to FIGS. 6A to 6D.

Next, the processing unit 44x may calculate a representative position in the optical intensity distribution for each of the rows processed in S400 (S500). This process may be performed on the image data captured by the image sensor 41x of the X direction target sensor 40x. Likewise, the processing unit 44z may calculate a representative position in the optical intensity distribution for each of the rows processed in S400 (S500). This process may be performed on the image data captured by the image sensor 41z of the Z direction target sensor 40z. In the first embodiment, a center of gravity position in the optical intensity distribution may be calculated as the representative position in the optical intensity distribution. Details of the process for calculating the center of gravity position in the optical intensity distribution will be given later with reference to FIGS. 7A to 7C.

Next, the processing unit 44x may calculate regression line parameters as the data of the actual path of the targets 27, from the representative positions in the optical intensity distributions calculated for each of the plurality of rows in S500 (S600). This process may be performed on the image data captured by the image sensor 41x of the X direction target sensor 40x. The regression line parameters may be calculated using the least-squares method. The regression line can express the actual path of the targets 27 projected onto an XY plane. The regression line may be represented as indicated by, for example, Formula 1.

$$X - X_1 = Y \cdot \tan \theta_X \quad \text{Formula 1}$$

Here, $X_1$ and $\theta_X$ can each be a constant. The regression line parameters can include coordinates (X, Y) of a point through which the regression line passes, namely ($X_1$, 0), and information regarding a slope of the regression line (1/tan $\theta_X$). Assuming a straight line is specified, the regression line parameters may include information that is different from the stated information.

Likewise, the processing unit 44z may calculate regression line parameters based on the image data captured by the image sensor 41z of the Z direction target sensor 40z (S600). The regression line can express the actual path of the targets 27 projected onto a ZY plane.

Next, the processing unit 44x and the processing unit 44z may send the regression line parameters calculated in S600 to the target controller 52 (S700). The target controller 52 can adjust the X direction position and Z direction position to which the targets 27 are supplied by controlling the dual-axis stage 63 of the target supply device 26 based on the regression line parameters.

Next, the processing unit 44x and the processing unit 44z may determine whether or not to end the detection of the actual path of the targets 27 (S800). Whether or not to end the detection of the actual path of the targets 27 may be determined based on whether or not the target controller 52 has stopped sending the target supply signal.

In the case where the processing unit 44x and the processing unit 44z have not determined to end the detection of the actual path of the targets 27, the processing may return to the aforementioned S150, and the actual path of the targets 27 may be detected again. In the case where the processing unit 44x and the processing unit 44z have determined to end the detection of the path actual of the targets 27, the processing of this flowchart may end.

4.2.2 Image Data Loading (Details of S200)

Figure 4A:
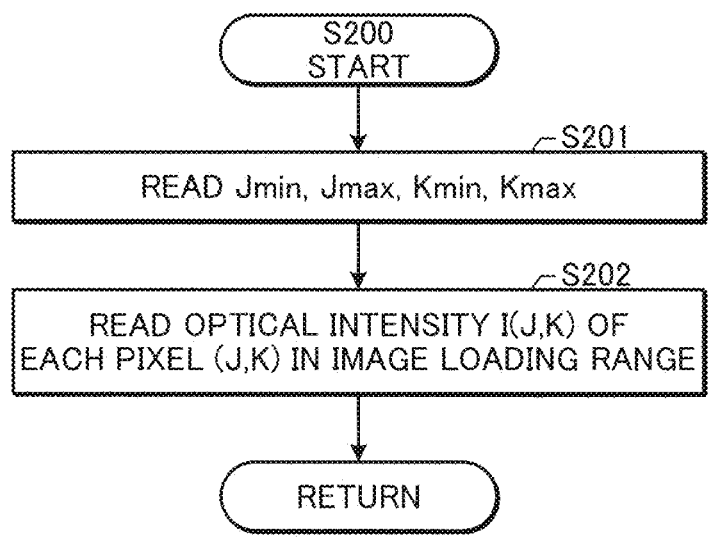
FIG. 4A is a flowchart illustrating an image data loading process indicated in FIG. 3.
Figure 4B:
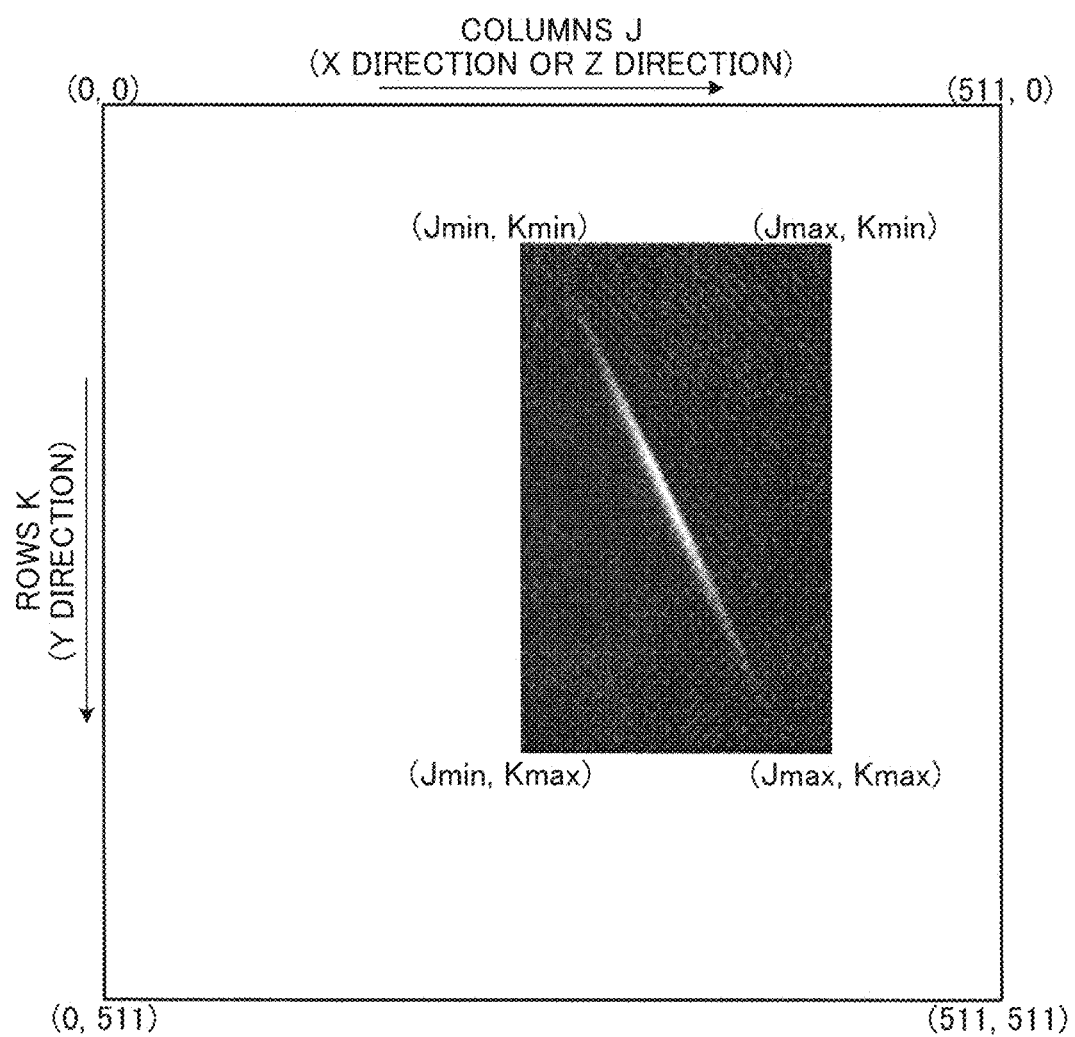
FIG. 4B illustrates an image data loading range.

FIG. 4A is a flowchart illustrating the image data loading process indicated in FIG. 3. FIG. 4B illustrates an image data loading range. The processes shown in FIG. 4A may be carried out by the processing unit 44x as a subroutine of S200, indicated in FIG. 3. Here, a process through which the processing unit 44x loads the image data outputted by the image sensor 41x of the X direction target sensor 40x will be described. The processing unit 44z may load the image data outputted by the image sensor 41z of the Z direction target sensor 40z in the same manner.

First, the processing unit 44x may read a value indicating the image data loading range from the storage unit 46x (S201). The value indicating the image data loading range can be defined by a minimum value (Jmin) and a maximum value (Jmax) of the column numbers J and a minimum value (Kmin) and a maximum value (Kmax) of the row numbers K. In the case where the image data captured by the image sensor 41x includes 512 columns×512 rows of pixels, the values of Jmin and Jmax may be integers in a range defined as 0≤Jmin<Jmax≤511, and the values of Kmin and Kmax may be integers in a range defined as 0≤Kmin<Kmax≤511.

Next, the processing unit 44x may read data of the optical intensities of the pixels within the set loading range from the image data captured by the image sensor 41x (S202). In other words, using the details of S201 described above as an example, optical intensity data of a pixel (Jmin, Kmin), a pixel (Jmax, Kmin), a pixel (Jmax, Kmax), a pixel (Jmin, Kmax), and the pixels surrounded by those four pixels may be loaded. By loading the optical intensity data of the pixels in a range limited in such a manner, the processes that follow thereafter can be accelerated.

The processing unit 44x may end the processing shown in the flowchart in FIG. 4A once the optical intensity data of the pixels in the specified range has been loaded.

The values of Jmin, Jmax, Kmin, and Kmax read in S201 may be values that are always constant, or may be changed depending on circumstances. For example, in the case where the data of the actual path of the targets 27 calculated in the past is stable, a narrower range of pixels may be specified. Alternatively, in the case where the data of the actual path of the targets 27 calculated in the past deviates greatly from a desired trajectory, a wider range of pixels may be specified. A "wider range of pixels" may be, for example, all pixels contained in the image data captured by the image sensor 41x.

4.2.3 Contrast Checking (Details of S300)

Figure 5A:
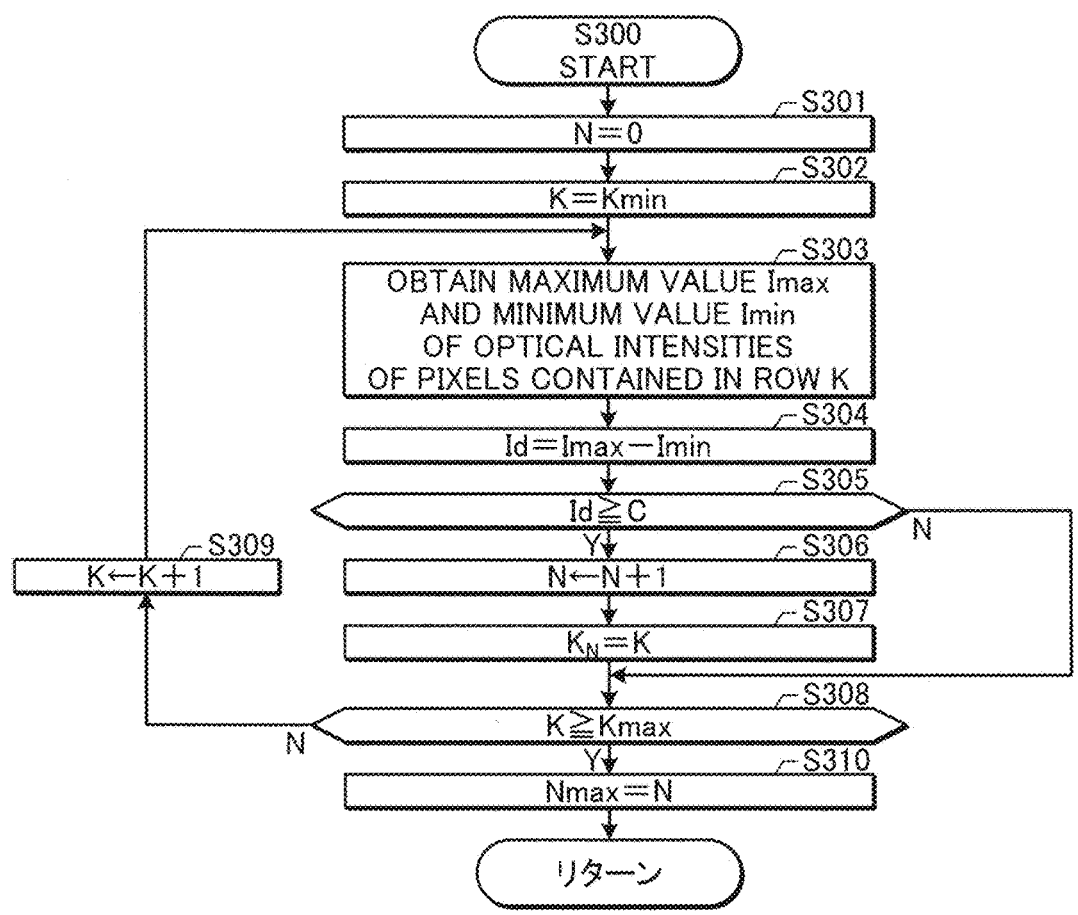
FIG. 5A is a flowchart illustrating a contrast checking process indicated in FIG. 3.
Figure 5B:
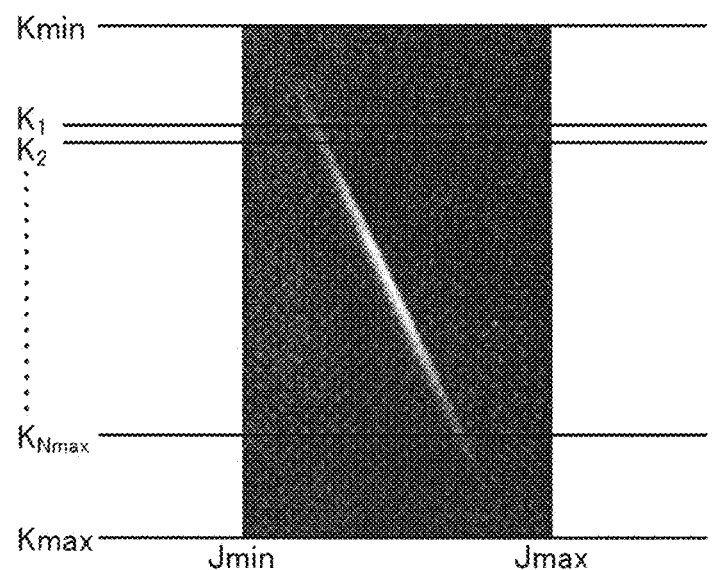
FIG. 5B illustrates an image range on which contrast checking is performed.
Figure 5C:
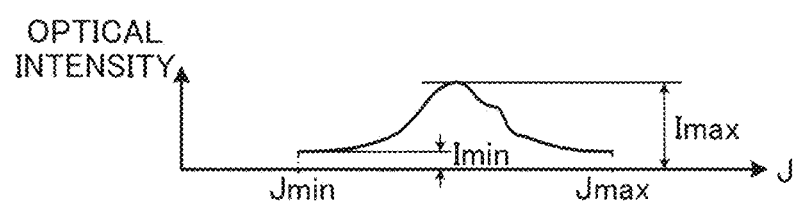
FIG. 5C illustrates an optical intensity distribution in a single line contained in the image shown in FIG. 5B.

FIG. 5A is a flowchart illustrating a contrast checking process indicated in FIG. 3. FIG. 5B illustrates an image range on which the contrast checking is performed. FIG. 5C illustrates an optical intensity distribution in a single row contained in the image shown in FIG. 5B. The processes shown in FIG. 5A may be carried out by the processing unit 44x as a subroutine of S300, indicated in FIG. 3. Here, processing performed by the processing unit 44x in the case where the image data outputted by the image sensor 41x of the X direction target sensor 40x has been loaded in the aforementioned S200 will be described. The processing unit 44z may perform the same type of processing in the case where the image data outputted by the image sensor 41z of the Z direction target sensor 40z has been loaded in the aforementioned S200. Meanwhile, the processing illustrated in FIG. 5A may be carried out only on the data loaded in the aforementioned S202, or in other words, only on the optical intensity data of the pixels in the range specified in S201.

First, the processing unit 44x may set a counter N to 0 (S301). The value of the counter N can be given so that each of rows whose optical intensity contrasts are greater than or equal to a set value can be specified, as will be described below. The value of the counter N can be an integer from 0 to a maximum value Nmax. The maximum value Nmax of the counter N will be described later.

Next, the processing unit 44x may set the row number K to Kmin (S302). Whether or not the optical intensity contrast is greater than or equal to a set value can be determined for each of the rows from Kmin to Kmax through the processing performed in S303 to S309, as will be described below.

The processing unit 44x may obtain a maximum value Imax and a minimum value Imin (see FIG. 5C) of the optical intensities in a plurality of pixels contained in the row specified by the current row number K (S303). In the following descriptions, when the phrase "plurality of pixels contained in the row specified by the current row number K" is used, those pixels may be limited to the pixels from the column number Jmin to the column number Jmax.

Next, the processing unit 44x may calculate a difference Id between the maximum value Imax and the minimum value Imin for each optical intensity obtained in S303 through the following formula (S304).

$$Id = Imax - Imin$$

Next, the processing unit 44x may determine whether or not the optical intensity difference Id calculated in S304 is greater than or equal to a predetermined threshold C (S305). For example, in the case where the optical intensity value in each pixel is expressed as a 256-gradation value (that is, an integer from 0 to 255), the predetermined threshold C may be 30.

In the case where the optical intensity difference Id is greater than or equal to the predetermined threshold C (S305: YES), the processing unit 44x may update the value of the counter N by adding 1 to the current value of the counter N (S306). The processing unit 44x may then store the current value of the row number K in the storage unit 46x as an extracted row number $K_N$ (S307). In other words, the processing unit 44x may extract the value of a row number K for a row whose optical intensity contrast is greater than or equal to a set value as the extracted row number $K_N$.

The extracted row number $K_N$ can be expressed as $K_1$, $K_2$, and so on up to $K_{Nmax}$, in accordance with the value of the counter N. The extracted row number $K_N$ is extracted from the minimum value Kmin to the maximum value Kmax of the row numbers in the range loaded in S202, and thus the value of the extracted row number $K_N$ can be an integer in a range defined as $Kmin \leq K_{Nmax} \leq Kmax$ (see FIG. 5B).

Once the current value of the row number K has been stored as the extracted row number $K_N$, the processing unit 44x may advance the processing to S308.

In the case where the optical intensity difference Id is less than the predetermined threshold C (S305: NO), the processing unit 44x may skip the processes of S306 and S307, and may advance the processing to S308. In other words, the processing unit 44x may refrain from extracting the value of the row number K for a row whose optical intensity contrast is less than the set value as the extracted row number $K_N$, and may refrain from updating the value of the counter N.

In S308, the processing unit 44x may determine whether or not the current value of the row number K has reached the maximum value Kmax of the row numbers in the range loaded in S202.

In the case where the current value of the row number K has not reached the maximum value Kmax (S308: NO), the processing unit 44x may update the value of K by adding 1 to the current value of the row number K (S309) and may then return the processing to S303. Through this, the processing unit 44x may determine whether or not the optical intensity contrast in the row specified by the next row number K is greater than or equal to the set value.

In the case where the current value of the row number K has reached the maximum value Kmax (S308: YES), the processing unit 44x may store the current value of the counter N in the storage unit 46x as the maximum value Nmax (S310).

As a result of this processing, the extracted row numbers $K_N$ can be specified from $K_1$ to $K_{Nmax}$ and rows whose optical intensity contrasts are greater than or equal to the set value can be extracted.

The processing unit 44x may end the processing shown in the flowchart in FIG. 5A when the processing of S310 ends.

4.2.4 Background Noise Removal (Details of S400)

Figure 6A:
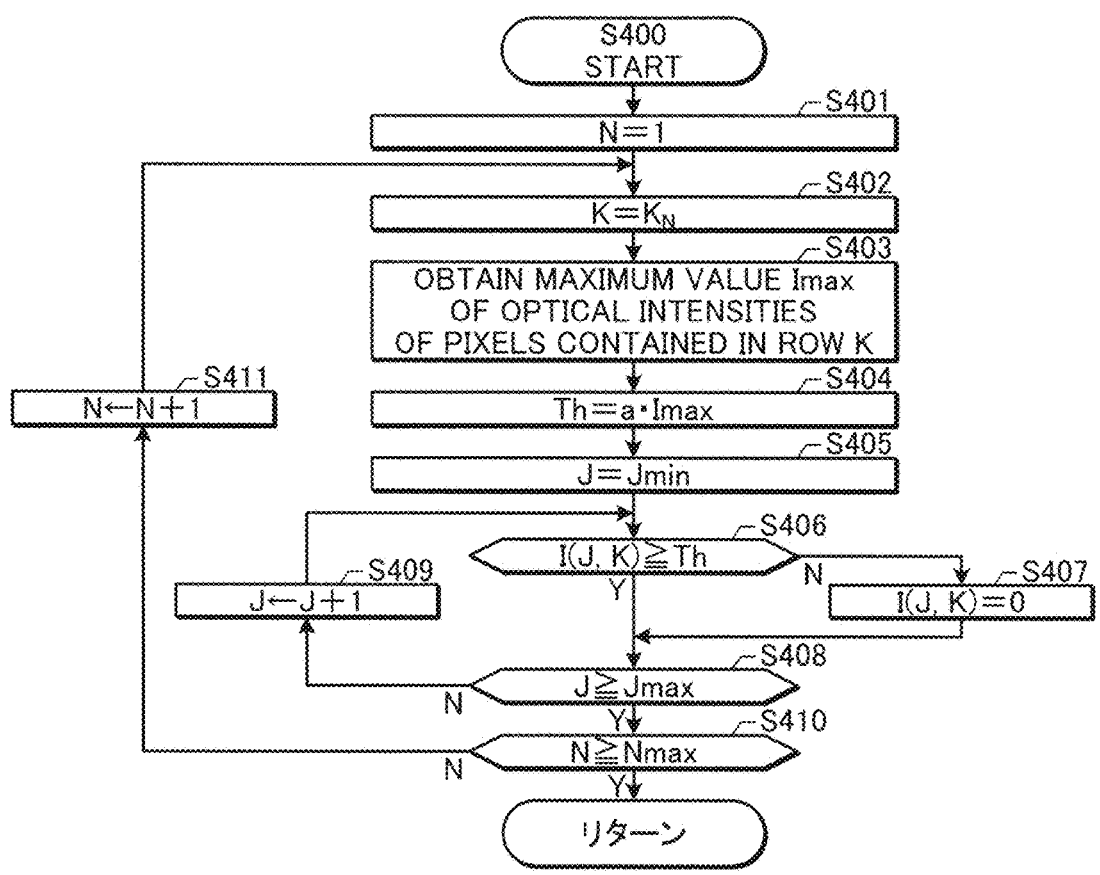
FIG. 6A is a flowchart illustrating a background noise removal process indicated in FIG. 3.
Figure 6B:
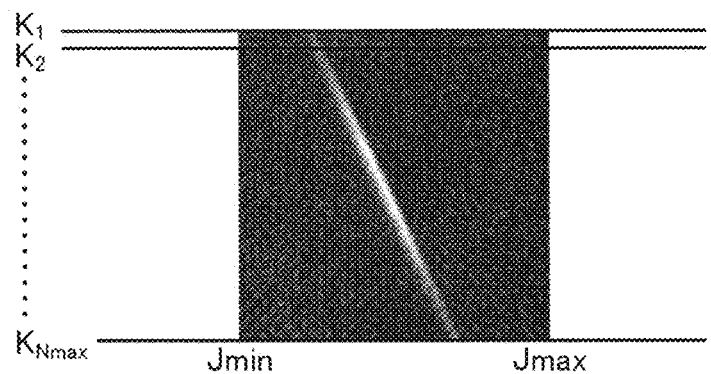
FIG. 6B illustrates an image range from which background noise is removed.
Figure 6C:
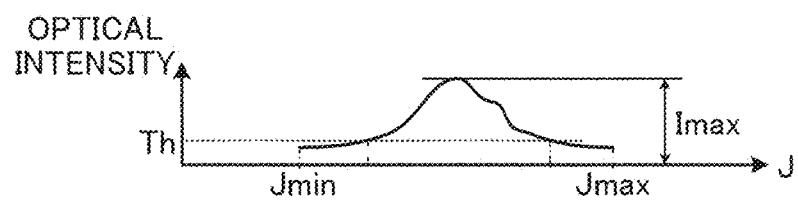
FIG. 6C illustrates an optical intensity distribution in a single line contained in the image shown in FIG. 6B.
Figure 6D:
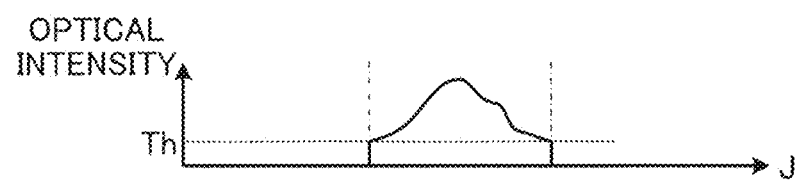
FIG. 6D illustrates an optical intensity distribution obtained when background noise has been removed from the optical intensity distribution shown in FIG. 6C.

FIG. 6A is a flowchart illustrating the background noise removal process indicated in FIG. 3. FIG. 6B illustrates an image range from which background noise is removed. FIG. 6C illustrates an optical intensity distribution in a single row contained in the image shown in FIG. 6B, FIG. 6D illustrates an optical intensity distribution obtained when background noise has been removed from the optical intensity distribution shown in FIG. 6C. The processes shown in FIG. 6A may be carried out by the processing unit 44x as a subroutine of S400, indicated in FIG. 3. Here, processing performed by the processing unit 44x in the case where the image data outputted by the image sensor 41x of the X direction target sensor 40x has been loaded in the aforementioned S200 will be described. The processing unit 44z may perform the same type of processing in the case where the image data outputted by the image sensor 41z of the Z direction target sensor 40z has been loaded in the aforementioned S200. In addition, the processing shown in FIG. 6A may be carried out only on the rows extracted as the extracted row numbers $K_N$ through the aforementioned processing from S303 to S309.

First, the processing unit 44x may set the stated counter N to 1 (S401)

Next, the processing unit 44x may set the row number K to $K_N$ (S402). A process for removing background noise from each of the rows specified by the extracted row numbers $K_N$ from $K_1$ to $K_{Nmax}$ can be carried out by performing the processes of S402 to S411, as will be described below (see FIG. 6B)

Next, the processing unit 44x may obtain the maximum value Imax of the optical intensities in a plurality of pixels contained in the row specified by the current row number K (S403). The value of the maximum value Imax may be used to calculate a threshold described below.

Next, the processing unit 44x may calculate a threshold Th for determining the background noise using the following formula (S404).

$$Th = a \cdot Imax$$

Here, "a" may be a constant in a range defined as $0 < a < 1$. For example, "a" may be equal to 0.1.

Next, the processing unit 44x may set the column number J to Jmin (S405). As will be described below, the optical intensity value can be compared to the threshold Th for each of the pixels, among the plurality of pixels in the row currently specified by the row number K, that are specified by the column numbers J from Jmin to Jmax, through the processing from S406 to S409 (see FIG. 6C).

The processing unit 44x may determine whether or not the value of the optical intensity I(J, K) of the pixel (J, K) defined by the current row number K and column number J is greater than or equal to the threshold Th (S406).

In the case where the value of the optical intensity I(J, K) is less than the threshold Th (S406: NO), the processing unit 44x may change the value of the optical intensity I(J, K) of that pixel (J, K) to 0 (S407). As a result, the optical intensity data of pixels whose optical intensities are less than the threshold can be removed as background noise (see FIG. 6D). The processing unit 44x may advance the processing to S408 after changing the value of the optical intensity I(J, K) of the pixel (J, K) to 0.

In the case where the value of the optical intensity I(J, K) is greater than or equal to the threshold Th (S406: YES), the processing unit 44x may advance the processing to S408 without changing the value of the optical intensity I(J, K) of the pixel (J, K).

In S408, the processing unit 44x may determine whether or not the current value of the column number J has reached the maximum value Jmax of the column numbers in the range loaded in S202.

In the case where the current value of the column number J has not reached the maximum value Jmax (S408: NO), the processing unit 44x may update the value of the column number J by adding 1 to the current value of J (S409), and may then return the processing to S406. Through this, the processing unit 44x may determine whether or not the value of the optical intensity I(J, K) of the pixel (J, K) specified by the next column number J is greater than or equal to the threshold Th.

In the case where the current value of the column number J has reached the maximum value Jmax (S408: YES), the processing unit 44x may determine whether or not the current value of the counter N has reached the maximum value Nmax stored in S310 (S410).

In the case where the current value of the counter N has not reached the maximum value Nmax (S410: NO), the processing unit 44x may update the value of the counter N by adding 1 to the current value of N (S411), and may then return the processing to S402. Through this, the processing unit 44x may perform a process for removing background noise from the row specified by the next extracted row numbers $K_N$.

In the case where the current value of the counter N has reached the maximum value Nmax (S410: YES), the processing unit 44x may end the processing shown in the flowchart of FIG. 6A.

4.2.5 Calculation of Center of Gravity of Optical Intensity Distribution (Details of S500)

Figure 7A:
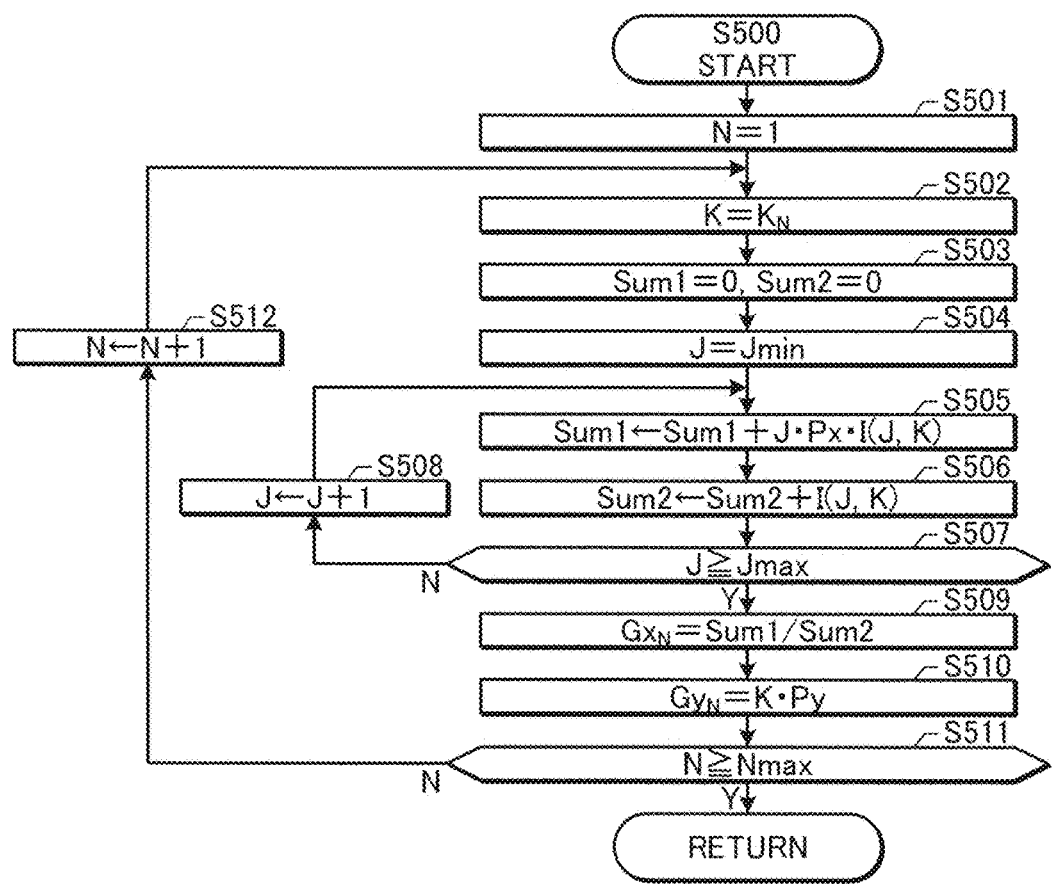
FIG. 7A is a flowchart illustrating a process for calculating a representative position in the optical intensity distribution shown in FIG. 3.
Figure 7B:
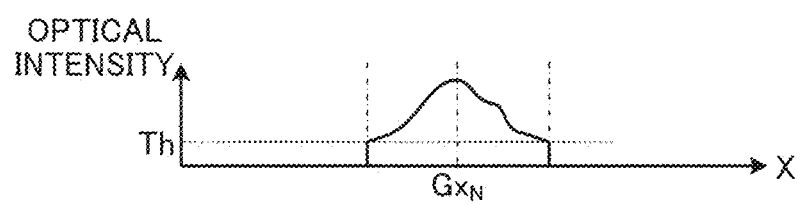
FIG. 7B illustrates an optical intensity distribution along the X direction at a specific Y direction position in a trajectory of a target and the periphery of that trajectory.
Figure 7C:
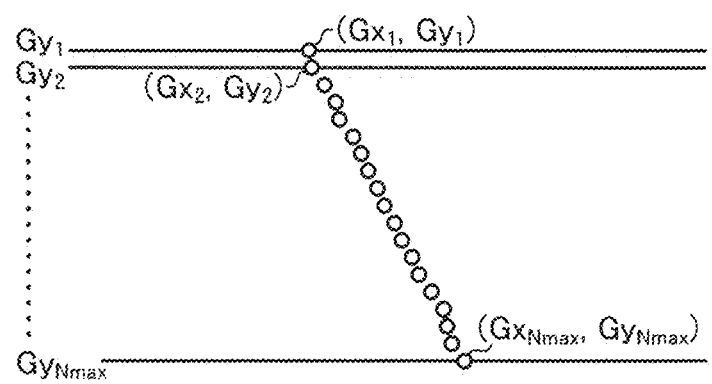
FIG. 7C illustrates a representative position in an optical intensity distribution in each of a plurality of Y direction positions.

FIG. 7A is a flowchart illustrating a process for calculating a representative position in the optical intensity distribution shown in FIG. 3. FIG. 7B illustrates an optical intensity distribution along the X direction at a specific Y direction position in a trajectory of a target and the periphery of that trajectory. FIG. 7C illustrates a representative position in an optical intensity distribution in each of a plurality of Y direction positions. The processes shown in FIG. 7A may be carried out by the processing unit 44x as a subroutine of S500, indicated in FIG. 3. Here, processing performed by the processing unit 44x in the case where the image data outputted by the image sensor 41x of the X direction target sensor 40x has been loaded in the aforementioned S200 will be described. The processing unit 44x may calculate an X direction center of gravity position $Gx_N$ and a Y direction center of gravity position $Gy_N$, as will be described below. The processing unit 44z may perform the same type of processing in the case where the image data outputted by the image sensor 41z of the Z direction target sensor 40z has been loaded in the aforementioned S200. The processing unit 44z may calculate a Z direction center of gravity position and a Y direction center of gravity position. Meanwhile, the processing illustrated in FIG. 7A may use data of the optical intensity I(J, K) from which the background noise has been removed through the aforementioned process of S400.

In the first embodiment, a center of gravity position in the optical intensity distribution may be calculated as the representative position in the optical intensity distribution. The optical intensity distribution of the trajectory of the targets 27 and the periphery thereof is transferred to the light-receiving unit in the image sensor 41x of the X direction target sensor 40x, and image data is generated based thereon. Assuming x represents a position in the X direction, and f (x) represents the optical intensity at the position x at a specific Y direction position in the trajectory of the targets 27 and the periphery thereof, a center of gravity position Gx in the X direction of the optical intensity distribution can be defined by the following Formula 2.

$$Gx = (\int x \cdot f(x) dx) / \int f(x) dx \qquad \text{Formula 2}$$

In dynamics, the "center of gravity" can refer to a point of an object on which the resultant force of the gravity acting on the various parts of the object acts. Assuming that particles having masses in proportion to the optical intensities f(x) of the positions x along the X direction in a specific Y direction position are disposed at those respective positions x, the stated center of gravity position Gx can be equal to the "center of gravity", according to dynamics, of the collection of those particles.

The processing unit 44x may calculate the center of gravity position in the optical intensity distribution as described below, using the image data captured by the image sensor 41x of the X direction target sensor 40x.

First, the processing unit 44x may set the stated counter N to 1 (S501).

Next, the processing unit 44x may set the row number K to $K_N$ (S502). The process for calculating the center of gravity position in the optical intensity distribution can be carried out for each row specified by the extracted row numbers $K_N$ from $K_1$ to $K_{Nmax}$ through the processes from S502 to S512, which will be described below.

The processing unit 44x may set the value of a first integrated value Sum1 and a second integrated value Sum2 to 0 (S503). As will be described below, the first integrated value Sum1 can, in S509, use the same value as the first integrated value $(\int x \cdot f(x) dx)$ in the aforementioned Formula 2. The second integrated value Sum2 can, in S509, use the same value as the second integrated value $(\int f(x) dx)$ in the aforementioned Formula 2.

Next, the processing unit 44x may set the column number J to Jmin (S504). The values of the first integrated value Sum1 and the second integrated value Sum2 can be calculated using the optical intensity values of each pixel specified by the column numbers J from Jmin to Jmax for the current row number K through the processes from S505 to S508, which will be described below.

The processing unit 44x may update the value of the first integrated value Sum1 by adding a value obtained through a calculation (J·Px·I(J, K)) to the current value of the first integrated value Sum1 (S505). Here, J may be the column number of the current pixel (J, K). Px may be the product of the pixel pitch (the pitch in the column direction) of the light-receiving unit in the image sensor 41x and the inverse of the magnification rate of the image formed by the transfer optical system 42. The product of J and Px (J·Px) can be equal to the position x for calculating the first integrated value $(\int x \cdot f(x) dx)$ in the aforementioned Formula 2. I(J, K) may be the optical intensity value of the current pixel (J, K). I(J, K) can be equal to the optical intensity f (x) for calculating the first integrated value $(\int x \cdot f(x) dx)$ in the aforementioned Formula 2.

Next, the processing unit 44x may update the value of the second integrated value Sum2 by adding the value of I(J, K) to the current value of the second integrated value Sum2 (S506). Here, I(J, K) may be the optical intensity value of the current pixel (J, K). I(J, K) can be equal to the optical intensity f(x) for calculating the second integrated value $(\int f(x) dx)$ in the aforementioned Formula 2.

Next, the processing unit 44x may determine whether or not the current value of the column number J has reached the maximum value Jmax of the column numbers in the range loaded in S202 (S507).

In the case where the current value of the column number J has not reached the maximum value Jmax (S507: NO), the processing unit 44x may update the value of the column number J by adding 1 to the current value of J (S508), and may then return the processing to S505. Through this, the processing unit 44*x* may update the values of the first integrated value Sum1 and the second integrated value Sum2 using the value of the optical intensity I(J, K) of the pixel (J, K) specified by the next column number J.

In the case where the current value of the column number J has reached the maximum value Jmax (S507: YES), the processing unit 44*x* may calculate the value of the X direction center of gravity position $Gx_N$ in the optical intensity distribution in the row defined by the current row number K (S509; see FIG. 7B) through the following formula.

$$Gx_N = Sum1/Sum2$$

This center of gravity position $Gx_N$ can be equal to the center of gravity position Gx described with reference to the aforementioned Formula 2.

Next, the processing unit 44*x* may calculate the value of the Y direction center of gravity position $Gy_N$ corresponding to the current row number K through the following formula (S510)

$$Gy_N = K \cdot Py$$

Here, K may be the current row number. Py may be the product of the pixel pitch (the pitch in the row direction) of the light-receiving unit in the image sensor 41*x* and the inverse of the magnification rate of the image formed by the transfer optical system 42.

Next, the processing unit 44*x* may determine whether or not the current value of the counter N has reached the maximum value Nmax stored in S310 (S511)

In the case where the current value of the counter N has not reached the maximum value Nmax (S511: NO), the processing unit 44*x* may update the value of the counter N by adding 1 to the current value of N (S512), and may then return the processing to S502. Through this, the processing unit 44*x* may calculate the center of gravity position in the optical intensity distribution for the row specified by the next extracted row number $K_N$ (see FIG. 7C)

In the case where the current value of the counter N has reached the maximum value Nmax (S511: YES), the processing unit 44*x* may end the processing shown in the flowchart of FIG. 7A.

Once the processing unit 44*x* and the processing unit 44*z* have calculated the center of gravity positions of the optical intensity distributions, the processes of S600 (the regression line parameter calculation) and on shown in FIG. 3 may be carried out as described above.

Although the first embodiment uses optical intensity distributions transferred for each row, from $K_1$ to $K_{Nmax}$, in bitmap data captured by the image sensor 41*x* or the image sensor 41*z*, the present disclosure is not limited thereto. If optical intensity distributions can be obtained along at least two lines, a single straight line can be specified from the representative positions (center of gravity positions) in those optical intensity distributions. The "at least two lines" mentioned here are not limited to lines transferred to "rows" of the bitmap data, and are not limited to lines that are parallel to each other. The "at least two lines" may be any lines that intersect with the trajectory of the targets.

4.3 Effect

According to the first embodiment, regression line parameters may be calculated based on the representative positions in the optical intensity distributions. Through this, the actual path of the targets 27 can be accurately detected even in the case where the actual path of the targets 27 has deviated from a desired trajectory and the images of the targets 27 have become blurred.

Meanwhile, in the first embodiment, the X direction target sensor 40*x* is disposed tilted relative to the Z direction and the Z direction target sensor 40*z* is disposed tilted relative to the X direction, and thus there is a possibility that the images of the targets 27 that move essentially in the Y direction will become blurred. However, according to the first embodiment, the regression line parameters are calculated based on the representative positions in the optical intensity distributions, and thus the actual path of the targets 27 can be detected accurately.

5. Second Embodiment

Calculation of Representative Position in Optical Intensity Distribution

Figure 8A:
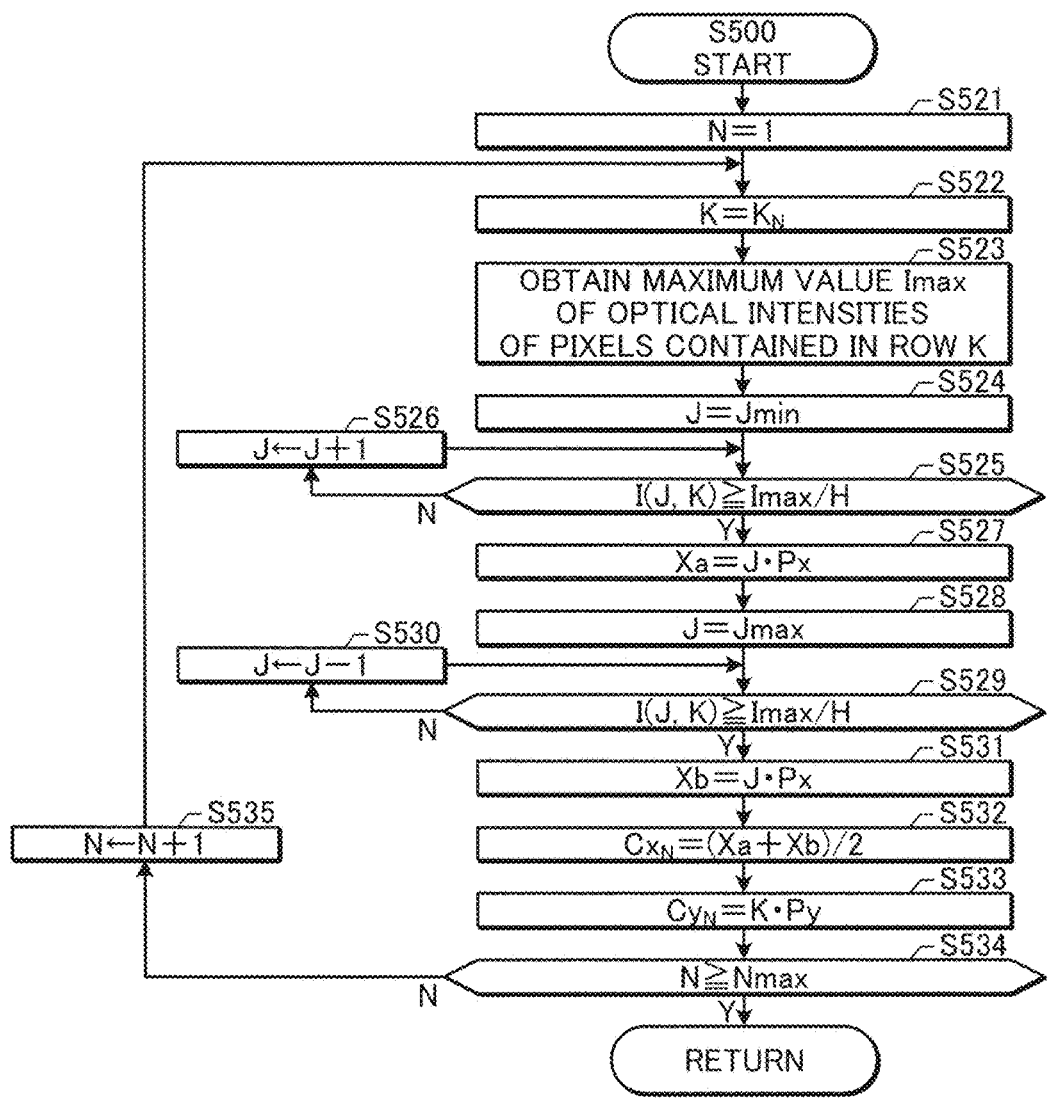
FIG. 8A is a flowchart illustrating a process for calculating a representative position in an optical intensity distribution according to a second embodiment.
Figure 8B:
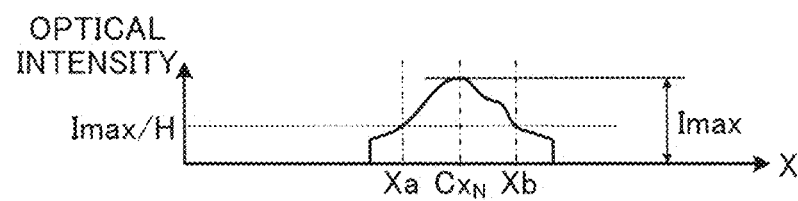
FIG. 8B illustrates an optical intensity distribution along the X direction at a specific Y direction position in a trajectory of a target and the periphery of that trajectory.
Figure 8C:
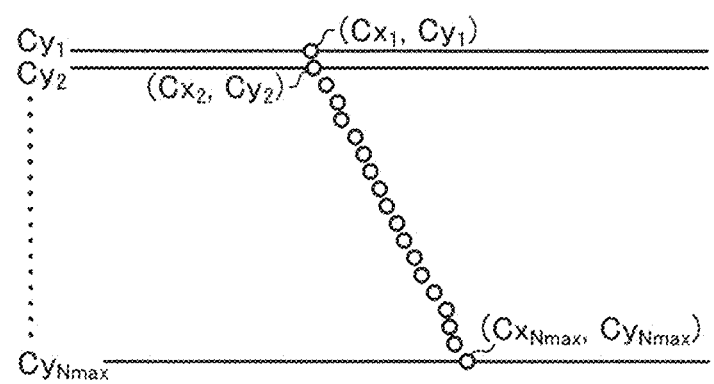
FIG. 8C illustrates a representative position in an optical intensity distribution in each of a plurality of Y direction positions.

FIG. 8A is a flowchart illustrating a process for calculating a representative position in an optical intensity distribution according to a second embodiment. FIG. 8B illustrates an optical intensity distribution along the X direction at a specific Y direction position in a trajectory of a target and the periphery of that trajectory. FIG. 8C illustrates a representative position in an optical intensity distribution in each of a plurality of Y direction positions. In the second embodiment, instead of performing the processing illustrated in FIG. 7A, a center position of an area of the optical intensity distribution having an optical intensity greater than or equal to a threshold may be calculated. The processes shown in FIG. 8A may be carried out by the processing unit 44*x* as a subroutine of S500, indicated in FIG. 3. Here, processing performed by the processing unit 44*x* in the case where the image data outputted by the image sensor 41*x* of the X direction target sensor 40*x* has been loaded in the aforementioned S200, shown in FIG. 3, will be described. The processing unit 44*x* may, as will be described below, calculate an X direction position $Cx_N$ and a Y direction position $Cy_N$ of the center of an area whose optical intensity is greater than or equal to a threshold. The processing unit 44*z* may perform the same type of processing in the case where the image data outputted by the image sensor 41*z* of the Z direction target sensor 40*z* is loaded, as indicated by S200 in FIG. 3. The processing unit 44*z* may calculate a Z direction position and a Y direction position of the center of an area whose optical intensity is greater than or equal to the threshold.

The processing illustrated in FIG. 8A may use data of the optical intensity I(J, K) from which the background noise has been removed through the aforementioned process of S400. Alternatively, in the second embodiment, the processing of S400, shown in FIG. 3, may be omitted, and data of the optical intensities I(J, K) in the rows extracted as the extracted row numbers $K_N$ through the processes from S303 to S309, mentioned earlier, may be used.

First, the processing unit 44*x* may set the stated counter N to 1 (S521).

Next, the processing unit 44*x* may set the row number K to $K_N$ (S522). The process for calculating the center position in the area of the optical intensity distribution whose optical intensity is greater than or equal to the threshold can be carried out for each row specified by the extracted row numbers $K_N$ from $K_1$ to $K_{Nmax}$, through the processes from S522 to S535, which will be described below.

The processing unit 44*x* may obtain the maximum value Imax of the optical intensities in a plurality of pixels contained in the row specified by the current row number K (S523). The value of the maximum value Imax may be used to calculate a threshold described in S525.

Next, the processing unit 44x may set the column number J to Jmin (S524). The value of the optical intensity of each pixel specified by the column number J can be compared to the threshold, in order starting with Jmin, for the row specified by the current row number K through the processes of S525 and S526, which will be described below.

The processing unit 44x may determine whether or not the value of the optical intensity I(J, K) of the current pixel (J, K) is greater than or equal to a threshold Imax/H (S525). Here, H may be a constant greater than 1. For example, H may be equal to 2, so that 1/H is equal to 0.5. In addition, H may be equal to $e^2$, so that 1/H is approximately equal to 0.135.

In the case where the value of the optical intensity I(J, K) is less than the threshold Imax/H (S525: NO), the processing unit 44x may update the value of the column number J by adding 1 to the current value of J (S526), and may then return the processing to S525. Through this, the processing unit 44x can sequentially determine whether or not the value of the optical intensity I(J, K) of the pixel (J, K) specified by the next column number J is greater than or equal to the threshold Imax/H, for the row specified by the current row number K.

In the case where the value of the optical intensity I(J, K) is greater than or equal to the threshold Imax/H (S525: YES), the processing unit 44x may calculate Xa, defined in the following formula, as the X direction position at one end of the area whose optical intensity is greater than or equal to the threshold (S527).

$$Xa = J \cdot Px$$

Here, J may be the column number of the current pixel (J, K). Px may be the product of the pixel pitch (the pitch in the column direction) of the light-receiving unit in the image sensor 41x and the inverse of the magnification rate of the image formed by the transfer optical system 42.

Next, the processing unit 44x may set the column number J to Jmax (S528). The value of the optical intensity of each pixel specified by the column number J can be compared to the threshold, in order starting with Jmax, for the row specified by the current row number K through the processes of S529 and S530, which will be described below.

The processing unit 44x may determine whether or not the value of the optical intensity I(J, K) of the current pixel (J, K) is greater than or equal to the threshold Imax/H (S529). Here, H may be the same as H in the above descriptions of S525.

In the case where the value of the optical intensity I(J, K) is less than the threshold Imax/H (S529: NO), the processing unit 44x may update the value of the column number J by subtracting 1 from the current value of 3 (S530), and may then return the processing to S529. Through this, the processing unit 44x can sequentially determine whether or not the value of the optical intensity I(J, K) of the pixel (J, K) specified by the previous column number J is greater than or equal to the threshold Imax/H, for the row specified by the current row number K.

In the case where the value of the optical intensity I(J, K) is greater than or equal to the threshold Imax/H (S529: YES), the processing unit 44x may calculate Xb, defined in the following formula, as the X direction position at the other end of the area whose optical intensity is greater than or equal to the threshold (S531).

$$Xb = J \cdot Px$$

Here, J may be the column number of the current pixel (J, K). Px may be the product of the pixel pitch (the pitch in the column direction) of the light-receiving unit in the image sensor 41x and the inverse of the magnification rate of the image formed by the transfer optical system 42.

Next, the processing unit 44x may, through the following formula, calculate the value of the position $Cx_N$ that is in the center of the X direction between the position Xa on the one end and the position Xb on the other end of the area whose optical intensity is greater than or equal to the threshold, for the row specified by the current row number K (S532).

$$Cx_N = (Xa + Xb)/2$$

Next, the processing unit 44x may calculate the value of the position $Cy_N$ in the center of the Y direction corresponding to the current row number K through the following formula (S533).

$$Cy_N = K \cdot Py$$

Here, K may be the current row number. Py may be the product of the pixel pitch (the pitch in the row direction) of the light-receiving unit in the image sensor 41x and the inverse of the magnification rate of the image formed by the transfer optical system 42.

Next, the processing unit 44x may determine whether or not the current value of the counter N has reached the maximum value Nmax stored in S310 (S534).

In the case where the current value of the counter N has not reached the maximum value Nmax (S534: NO), the processing unit 44x may update the value of the counter N by adding 1 to the current value of N (S535), and may then return the processing to S522. Through this, the processing unit 44x may calculate the center positions in the X direction and the Y direction of the area whose optical intensity is greater than or equal to the threshold, for the row specified by the next extracted row number $K_N$.

In the case where the current value of the counter N has reached the maximum value Nmax (S534: YES), the processing unit 44x may end the processing shown in the flowchart of FIG. 8A.

The embodiment may be the same as the first embodiment in other respects.

6. Third Embodiment

Use of Line Sensors

Figure 9A:
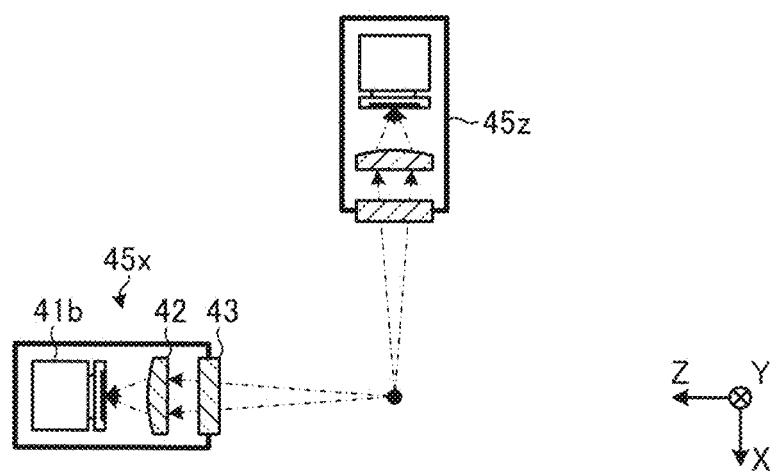
FIG. 9A is a partial cross-sectional view of target sensors in an EUV light generation apparatus according to a third embodiment.
Figure 9B:
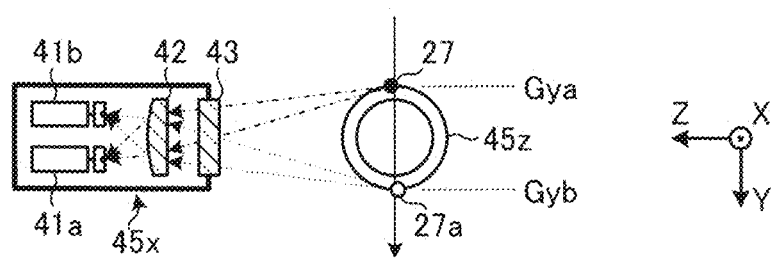
FIG. 9B is a partial cross-sectional view of the target sensors in the EUV light generation apparatus according to the third embodiment.
Figure 9C:
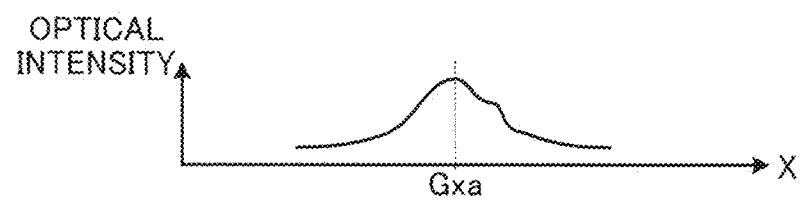
FIG. 9C illustrates an optical intensity distribution along the X direction at a first Y direction position in a trajectory of a target and the periphery of that trajectory.
Figure 9D:
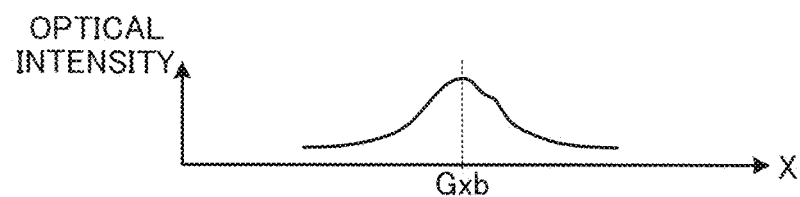
FIG. 9D illustrates an optical intensity distribution along the X direction at a second Y direction position in a trajectory of a target and the periphery of that trajectory.

FIGS. 9A and 9B are partial cross-sectional views of target sensors in an EUV light generation apparatus according to a third embodiment. FIG. 9A illustrates the target sensors from a Y direction side, whereas FIG. 9B illustrates the target sensors from a −X direction side. FIG. 9C illustrates an optical intensity distribution along the X direction at a first Y direction position in a trajectory of a target and the periphery of that trajectory. FIG. 9D illustrates an optical intensity distribution along the X direction at a second Y direction position in a trajectory of a target and the periphery of that trajectory.

In the third embodiment, an X direction target sensor 45x and a Z direction target sensor 45z may be used instead of the X direction target sensor 40x and the Z direction target sensor 40z described in the first embodiment.

The X direction target sensor 45x may include a first line sensor 41a, a second line sensor 41b, the transfer optical system 42, the window 43, and a processing unit (not shown). The first line sensor 41a and the second line sensor 41b may each have light-receiving units that are longer in one direction.

The first line sensor 41a may be disposed in a position where an image of the target 27 present at a first Y direction position Gya is formed by the transfer optical system 42. The first line sensor 41a may detect an optical intensity distribution along the X direction at the first Y direction position Gya (see FIG. 9C), and may output the detected optical intensity distribution. As in the first embodiment, the processing unit may calculate a first representative position Gxa in the optical intensity distribution. The first representative position Gxa may be the center of gravity position in the optical intensity distribution, or may be a center position of an area in the optical intensity distribution whose optical intensity is greater than or equal to a threshold.

The second line sensor 41b may be disposed in a position where an image of a target 27a present at a second Y direction position Gyb is formed by the transfer optical system 42. The second line sensor 41b may detect an optical intensity distribution along the X direction at the second Y direction position Gyb (see FIG. 9D), and may output the detected optical intensity distribution. As in the first embodiment, the processing unit may calculate a second representative position Gxb in the optical intensity distribution. The second representative position Gxb may be the center of gravity position in the optical intensity distribution, or may be a center position of an area in the optical intensity distribution whose optical intensity is greater than or equal to a threshold.

Figure 9E:
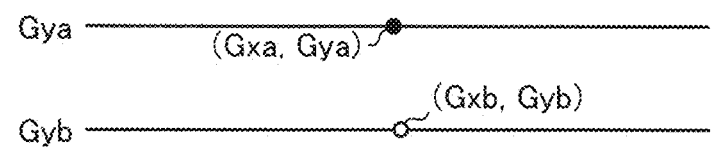
FIG. 9E illustrates a representative position in an optical intensity distribution in each of a plurality of Y direction positions.

FIG. 9E illustrates a representative position in an optical intensity distribution in each of a plurality of Y direction positions. The processing unit may calculate straight line parameters indicating the actual path of the targets based on the first representative position Gxa at the first Y direction position Gya and the second representative position Gxb at the second Y direction position Gyb. The straight line can express the actual path of the targets 27 projected onto an XY plane.

In the case where the X direction target sensor 45x includes three or more line sensors and representative positions in optical intensity distributions have been calculated for corresponding three or more Y direction positions, the processing unit 44x may calculate regression line parameters indicating the path of the targets.

The Z direction target sensor 45z may have the same configuration as the X direction target sensor 45x. The processing unit (not shown) of the Z direction target sensor 45z may calculate straight line parameters indicating the actual path of the targets 27 projected onto a ZY plane.

The embodiment may be the same as the first embodiment in other respects.

The above-described embodiments and the modifications thereof are merely examples for implementing the present disclosure, and the present disclosure is not limited thereto. Making various modifications according to the specifications or the like is within the scope of the present disclosure, and other various embodiments are possible within the scope of the present disclosure. For example, the modifications illustrated for particular ones of the embodiments can be applied to other embodiments as well (including the other embodiments described herein).

The terms used in this specification and the appended claims should be interpreted as "non-limiting." For example, the terms "include" and "be included" should be interpreted as "including the stated elements but not limited to the stated elements." The term "have" should be interpreted as "having the stated elements but not limited to the stated elements." Further, the modifier "one (a/an)" should be interpreted as "at least one" or "one or more."

What is claimed is:

1. An extreme ultraviolet light generation apparatus that irradiates a target with a pulse laser beam at a plasma generation region, the apparatus comprising:
    a chamber provided with a through-hole;
    a conducting optical system configured to conduct the pulse laser beam to the plasma generation region in the chamber via the through-hole;
    a target supply device configured to output the target toward the plasma generation region; and
    a target detection section, the target detection section including:
    a light source;
    a transfer optical system disposed tilted relative to a plane orthogonal to the trajectory of the target;
    an image sensor configured to output image data of an image that has been formed by irradiating the target outputted from the target supply device with light outputted from the light source and that has then been formed on a light-receiving unit of the image sensor transferred by the transfer optical system; and
    a processing unit, connected to the image sensor, configured to:
        receive the outputted image data,
        obtain, based on the image data of the image, a first optical intensity distribution along a first line that intersects with a trajectory of the target and a second optical intensity distribution along a second line that intersects with the trajectory,
        calculate a center of gravity position in the first optical intensity distribution and a center of gravity position in the second optical intensity distribution, and
        calculate parameters of a regression line expressing an actual path of the target based on the calculated center of gravity positions.

2. The extreme ultraviolet light generation apparatus according to claim 1, wherein the processing unit is further configured to:
    identify a plurality of rows in the image data of the image, and
    determine, for each of the plurality of rows, whether an optical intensity contrast is greater than or equal to a set value, wherein
    the first line is based on a first row of the plurality of rows, the first row having an optical intensity contrast greater than the set value, and
    the second line is based on a second row of the plurality of rows, the second row having an optical intensity contrast greater than the set value.

3. The extreme ultraviolet light generation apparatus according to claim 2, wherein the optical intensity contrast is determined based on a maximum value and a minimum value of the optical intensity in each of the plurality of rows.

4. The extreme ultraviolet light generation apparatus according to claim 1, wherein the processing unit is further configured to:
    obtain a third optical intensity distribution by removing background noise from the first optical intensity distribution and a fourth optical intensity distribution by removing background noise from the second optical intensity distribution, and
    calculate a center of gravity position in the third optical intensity distribution and a center of gravity position in the fourth optical intensity distribution.

5. The extreme ultraviolet light generation apparatus according to claim 4, wherein the background noise is determined based on a maximum value of the optical intensity in each of the first and second lines.

6. The extreme ultraviolet light generation apparatus according to claim 4, wherein the processing unit is further configured to:
identify a plurality of rows in the image data of the image, and
determine, for each of the plurality of rows, whether an optical intensity contrast is greater than or equal to a set value, wherein
the first line is based on a first row of the plurality of rows, the first row having an optical intensity contrast greater than the set value, and
the second line is based on a second row of the plurality of rows, the second row having an optical intensity contrast greater than the set value.

* * * * *